(12) United States Patent
Poster et al.

(10) Patent No.: US 11,377,168 B2
(45) Date of Patent: Jul. 5, 2022

(54) BRAKE CALIPER

(71) Applicant: Pacific Cycle, LLC, Madison, WI (US)

(72) Inventors: Matthew J. Poster, Madison, WI (US); Randall S. Koplin, Middleton, WI (US); Andrew C. Joncich, Madison, WI (US); Michael J. Hammond, Monona, WI (US); Kyle G. Neuser, Madison, WI (US); Erik P. Eagleman, Madison, WI (US)

(73) Assignee: Pacific Cycle, LLC, Madison, WI (US)

( * ) Notice: Subject to any disclaimer, the term of this patent is extended or adjusted under 35 U.S.C. 154(b) by 7 days.

(21) Appl. No.: 16/516,917

(22) Filed: Jul. 19, 2019

(65) Prior Publication Data

US 2020/0039605 A1    Feb. 6, 2020

Related U.S. Application Data

(60) Provisional application No. 62/713,067, filed on Aug. 1, 2018.

(51) Int. Cl.
*B62L 1/14*    (2006.01)
*B62L 1/10*    (2006.01)

(52) U.S. Cl.
CPC ..................... *B62L 1/14* (2013.01)

(58) Field of Classification Search
CPC ..................... B62L 1/10; B62L 1/14
See application file for complete search history.

(56) References Cited

U.S. PATENT DOCUMENTS

| | | | |
|---|---|---|---|
| 3,628,635 A | | 12/1971 | Yoshigai |
| 4,558,765 A | * | 12/1985 | Hogan ............... B62L 1/14 188/24.19 |
| 5,857,932 A | * | 1/1999 | Sugimoto ............ B62L 1/14 474/82 |
| 7,419,034 B1 | | 9/2008 | Wu |
| 7,802,660 B2 | | 9/2010 | Tsai |
| 8,061,487 B2 | | 11/2011 | Tsai |
| 8,096,392 B2 | | 1/2012 | Edwards et al. |
| 8,151,945 B2 | | 4/2012 | Tsai |
| 8,297,415 B2 | | 10/2012 | Edwards |
| 8,485,320 B2 | | 7/2013 | Jordan |
| 8,505,694 B2 | | 8/2013 | Ginster |
| 8,662,258 B2 | | 3/2014 | Watarai et al. |
| 9,004,517 B2 | | 4/2015 | Servet |
| 9,145,186 B2 | | 9/2015 | Wu |
| 2011/0127119 A1 | | 6/2011 | Tsai |

(Continued)

FOREIGN PATENT DOCUMENTS

| | | |
|---|---|---|
| JP | 5237342 | 3/1977 |
| JP | S5237342 | 3/1977 |

*Primary Examiner* — Melody M Burch
(74) *Attorney, Agent, or Firm* — James A. Joyce; Godfrey & Kahn, S.C.

(57) ABSTRACT

A brake caliper including a first brake arm, a cable bridge pivotably secured to the first brake arm, a second brake arm having a lower arm portion and an upper arm portion, a cam situated on the upper arm portion, the cam including a cable groove. The brake caliper further including a cam lever having a pivot portion rotatably secured to the upper arm portion at a cam lever axis, a latch portion for releasable securement to the second brake arm, and a cable clamp for securing a brake cable.

10 Claims, 15 Drawing Sheets

(56) References Cited

U.S. PATENT DOCUMENTS

| | | | |
|---|---|---|---|
| 2012/0222923 A1* | 9/2012 | Nago | B62L 1/16 |
| | | | 188/24.22 |
| 2014/0231187 A1* | 8/2014 | Wu | B62L 1/14 |
| | | | 188/24.22 |
| 2014/0291078 A1* | 10/2014 | McIntyre | B62L 1/12 |
| | | | 188/24.21 |
| 2016/0221752 A1* | 8/2016 | Satwicz | B65F 1/1426 |
| 2018/0043964 A1 | 2/2018 | Wen | |

* cited by examiner

BRAKE CALIPER

CROSS-REFERENCE

This application is based on U.S. Provisional Patent Application Ser. No. 62/713,067 filed on Aug. 1, 2018, of which priority is claimed and the disclosure of which is incorporated herein by reference for all purposes.

FIELD OF THE INVENTION

The present invention relates generally to the field of wheeled vehicles. More particularly, the present invention relates to a brake caliper for a bicycle.

BACKGROUND

Various wheeled vehicles, such as bicycles and scooters, utilize brake calipers to apply a stopping force to a rotating wheel. Many types of bicycles include a quick release mechanism for the attached wheels, which allow a user to remove a wheel quickly. Typical brake calipers maintain a braking position for a pair of brake blocks (i.e. brake pads), where the blocks are adjacent the rim of the wheel. The positioning of the blocks serve as an inconvenient barrier to removal of the wheel due to the tire portion, which is larger than the rim of the wheel. As such, to remove the wheel, it is necessary to release the brake caliper arms of the caliper to allow the blocks to move out of the way. As is commonly known in the art, brake calipers utilize a cable guide that is removably secured to a cable bridge attached to a first brake arm. The brake cable extends through the cable guide and is secured to a second brake arm situated on the opposite side of the wheel. To release the brake arms, a user must push the brake arms towards each other and remove the cable guide from the cable bridge, which releases the brake cable tension on the brake arms.

It will be understood by those skilled in the art that one or more aspects of this invention can meet certain objectives, while one or more other aspects can lead to certain other objectives. Other objects, features, benefits and advantages will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF SUMMARY

In at least some embodiments, a brake caliper is provided comprising: a first brake arm; a cable bridge pivotably secured to the first brake arm; a second brake arm having a lower arm portion and an upper arm portion; a cam situated on the upper arm portion, the cam including a cable groove; and a cam lever that further comprises: a pivot portion rotatably secured to the upper arm portion at a cam lever axis; a latch portion for releasable securement to the second brake arm; and a cable clamp for securing a brake cable.

In at least some other embodiments, a brake caliper is provided comprising: a first brake arm; a cable bridge pivotably secured to the first brake arm; a second brake arm having a lower arm portion and an upper arm portion; a cam protruding from an outer sidewall of the upper arm portion, the cam including an arced portion forming a cable groove; and a cam lever further comprising: a pivot portion rotatably secured to the upper arm portion at a cam lever axis; a latch portion for releasable securement to the second brake arm; and a cable clamp for securing a brake cable.

In at least yet some other embodiments, a brake caliper lever assembly is provided comprising: a brake arm having a lower arm portion and an upper arm portion; a cam situated on the upper arm portion, the cam including an arced portion forming a cable groove; and a cam lever further comprising: a pivot portion rotatably secured to the upper arm portion at a cam lever axis; a latch portion for releasable securement to the brake arm; and a cable clamp for securing a brake cable.

Further embodiments and features will become apparent from the detailed description, claims, and accompanying drawings.

DETAILED DESCRIPTION

Figure 1:
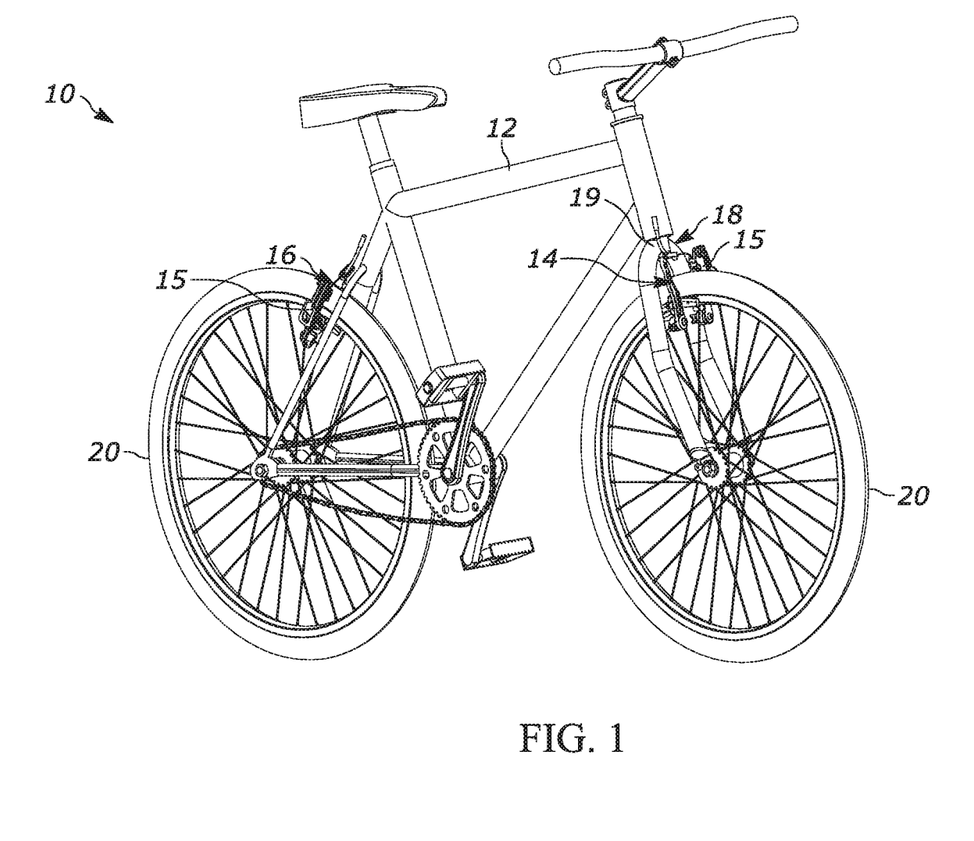
FIG. 1 is a perspective view of an exemplary embodiment of a bicycle including a frame coupled to front and rear brake calipers, a front fork assembly, and wheels.
Figure 2:
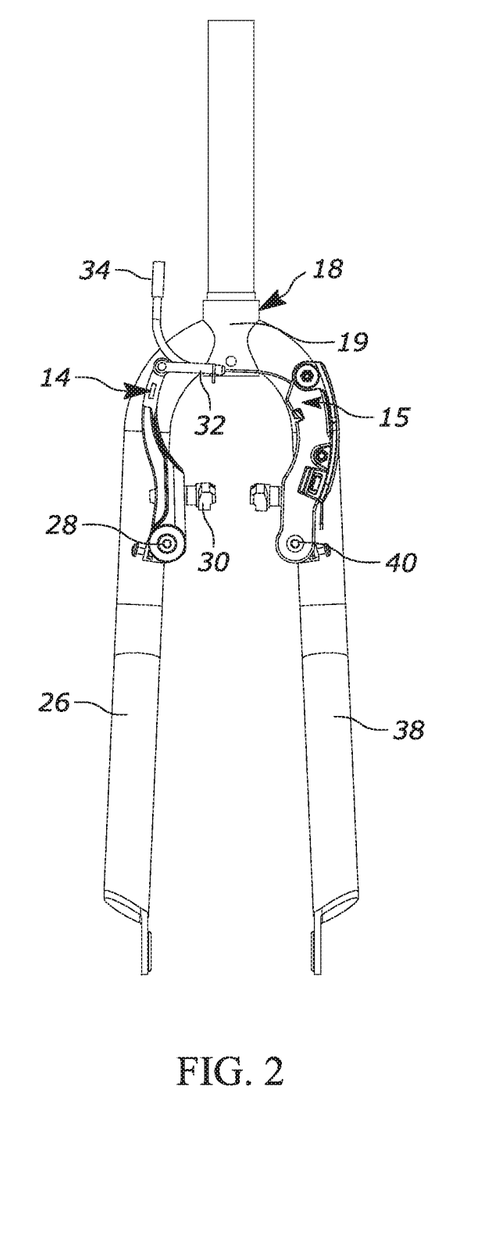
FIG. 2 is a front view of the front fork assembly and front brake caliper of FIG. 1.
Figure 3:
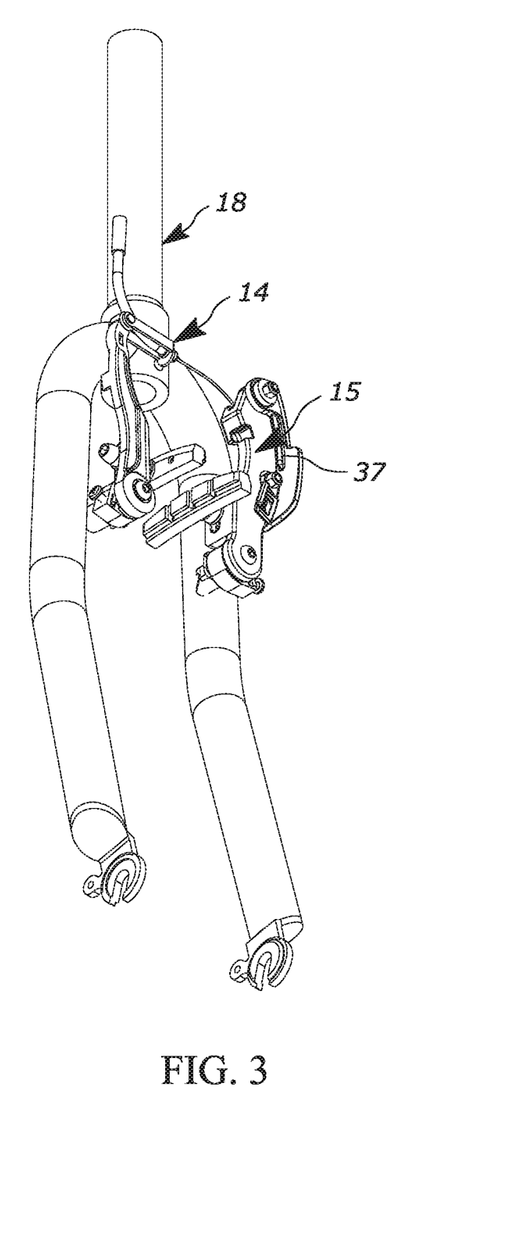
FIG. 3 is a bottom perspective of the front fork assembly and brake caliper of FIG. 2.
Figure 4:
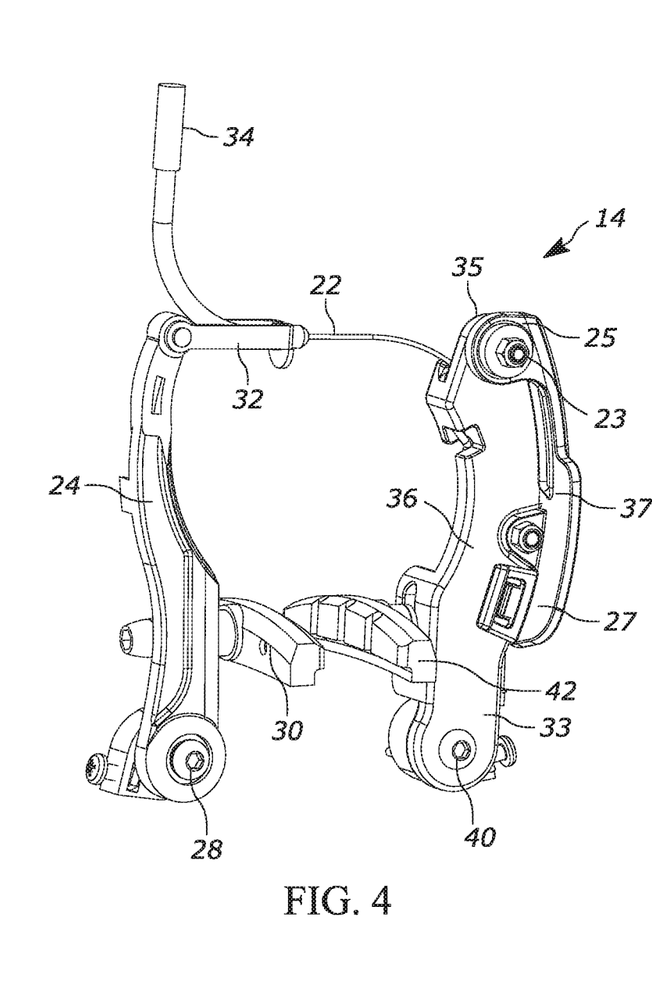
FIG. 4 is a front perspective view of the brake caliper of FIG. 2.
Figure 5:
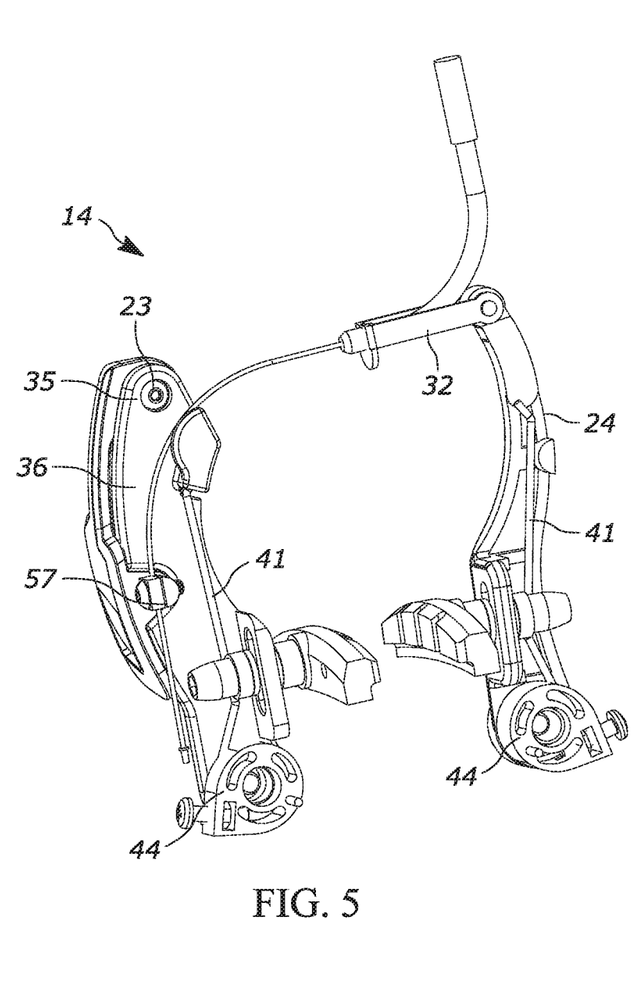
FIG. 5 is a rear perspective view of the brake caliper of FIG. 2.
Figure 6:
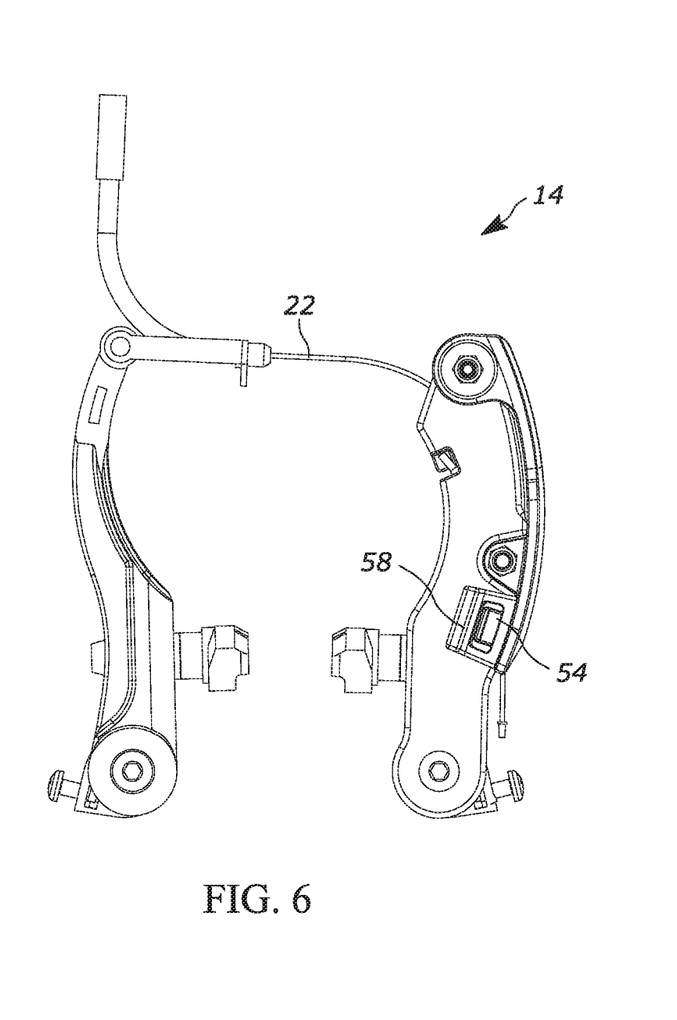
FIG. 6 is a front view of the brake caliper of FIG. 2.
Figure 7:
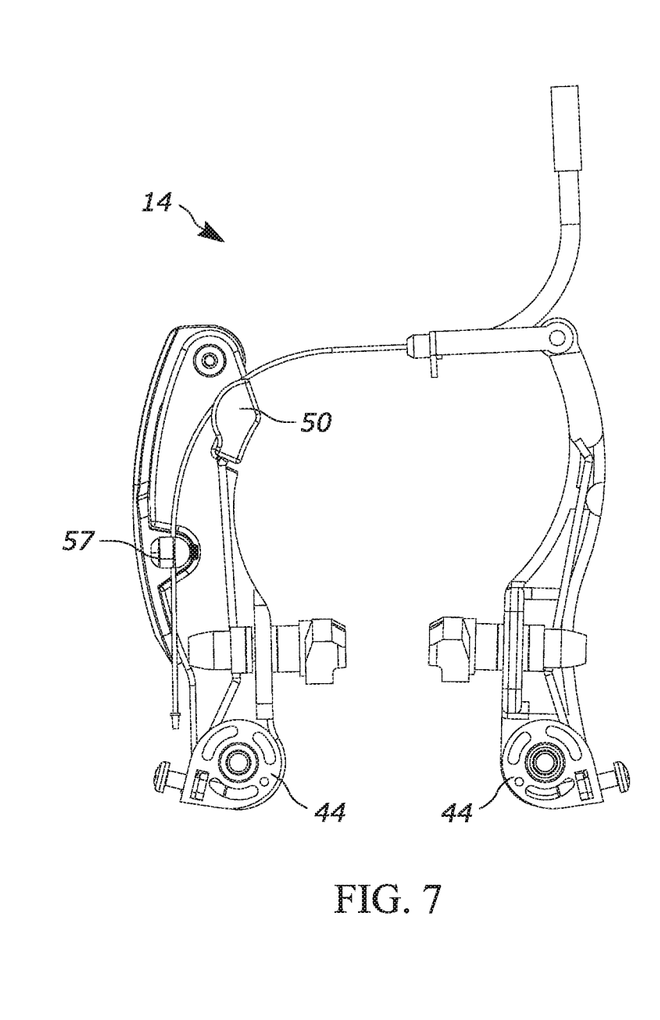
FIG. 7 is a rear view of the brake caliper of FIG. 2.
Figure 8:
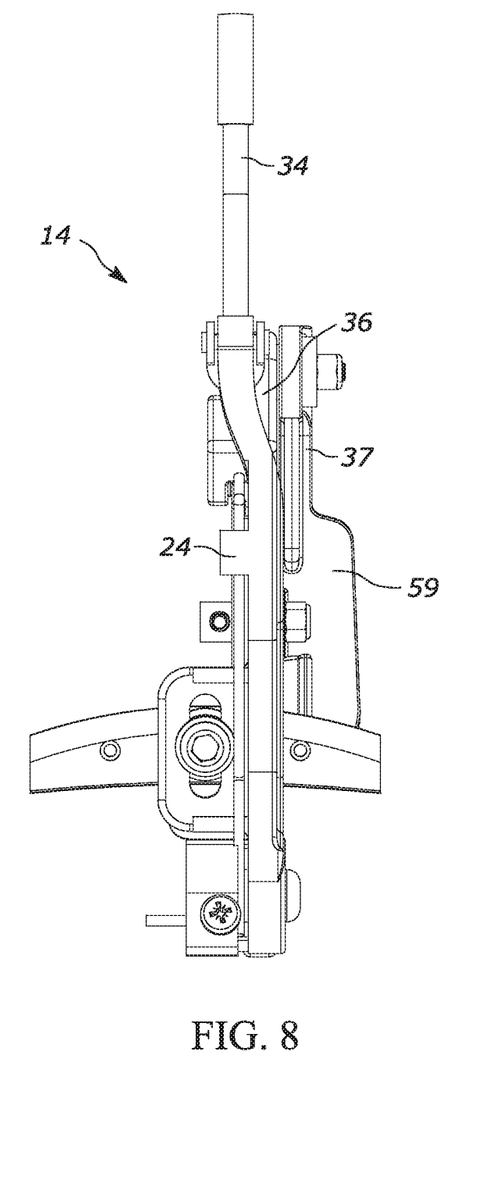
FIG. 8 is a first side view of the brake caliper of FIG. 2.
Figure 9:
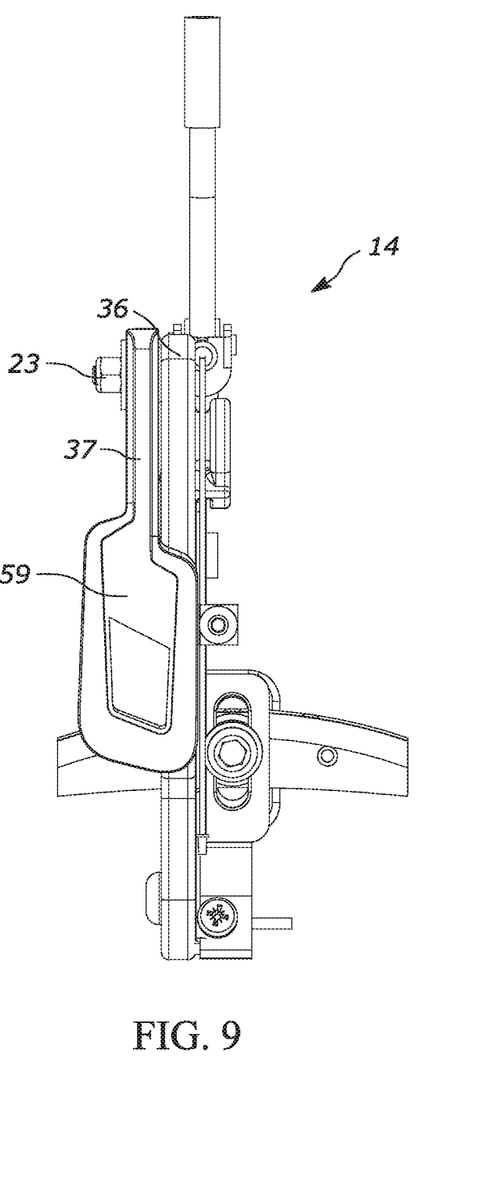
FIG. 9 is a second side view of the brake caliper of FIG. 2.
Figure 10:
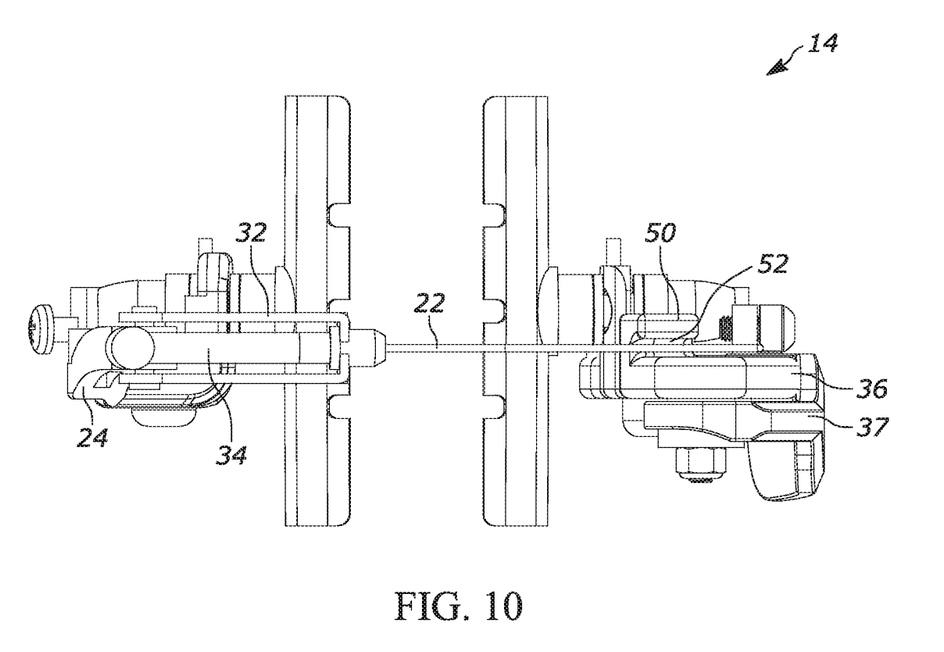
FIG. 10 is a top view of the brake caliper of FIG. 2.
Figure 11:
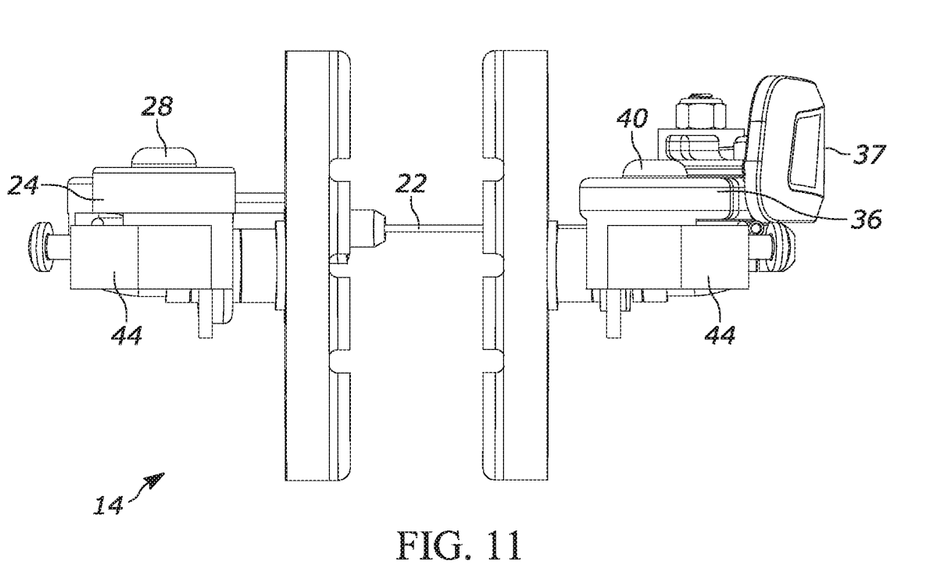
FIG. 11 is a bottom view of the brake caliper of FIG. 2.

Referring to FIG. 1, an exemplary bicycle 10 is illustrated having a frame 12 coupled to a brake caliper 14 incorporating a brake caliper lever assembly 15. The bicycle 10 further includes a front fork assembly 18 having a two-pronged fork 19 that secures both the brake caliper 14 and a wheel 20 thereto. FIGS. 2 and 3, provide front and perspective views of the front fork assembly 18 removed from the frame 12, and with the brake caliper 14 secured thereto. FIGS. 4-13 provide various views of the brake caliper 14 removed from the front fork assembly 18 and including a partial brake cable 22 secured thereto.

Referring to FIGS. 2-3, the brake caliper 14 includes a first brake arm 24 that is pivotably securable to a first fork leg 26 via an arm bolt 28. The first brake arm 24 further includes a first brake block 30 and a hinged cable bridge 32. The hinged cable bridge 32 is configured to removably secure a cable guide 34 thereto. The brake caliper 14 also includes a second brake arm 36, which along with a coupled cam lever 37, form the brake caliper lever assembly 15.

Figure 12:
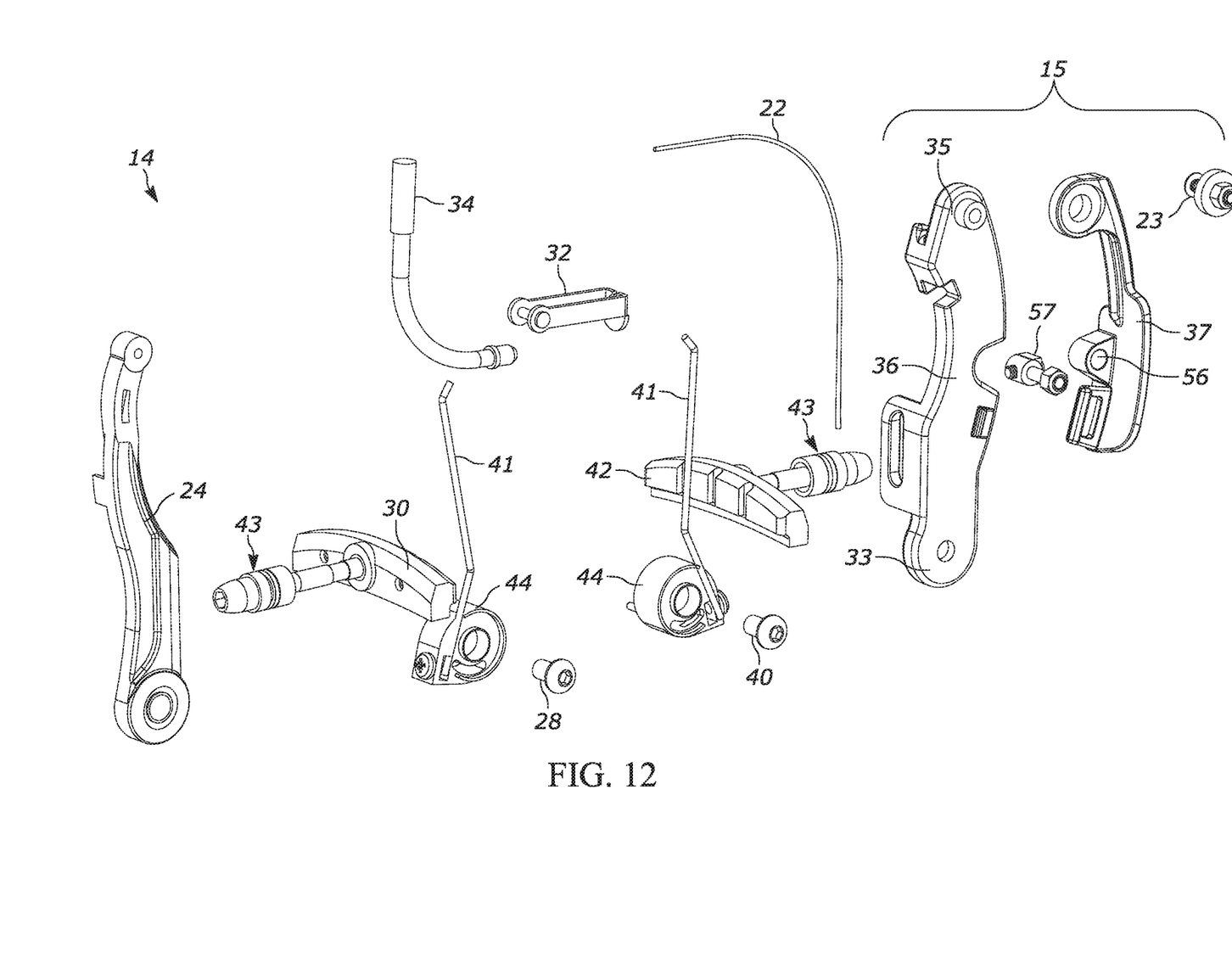
FIG. 12 is a top front perspective exploded view of the brake caliper of FIG. 2.
Figure 13:
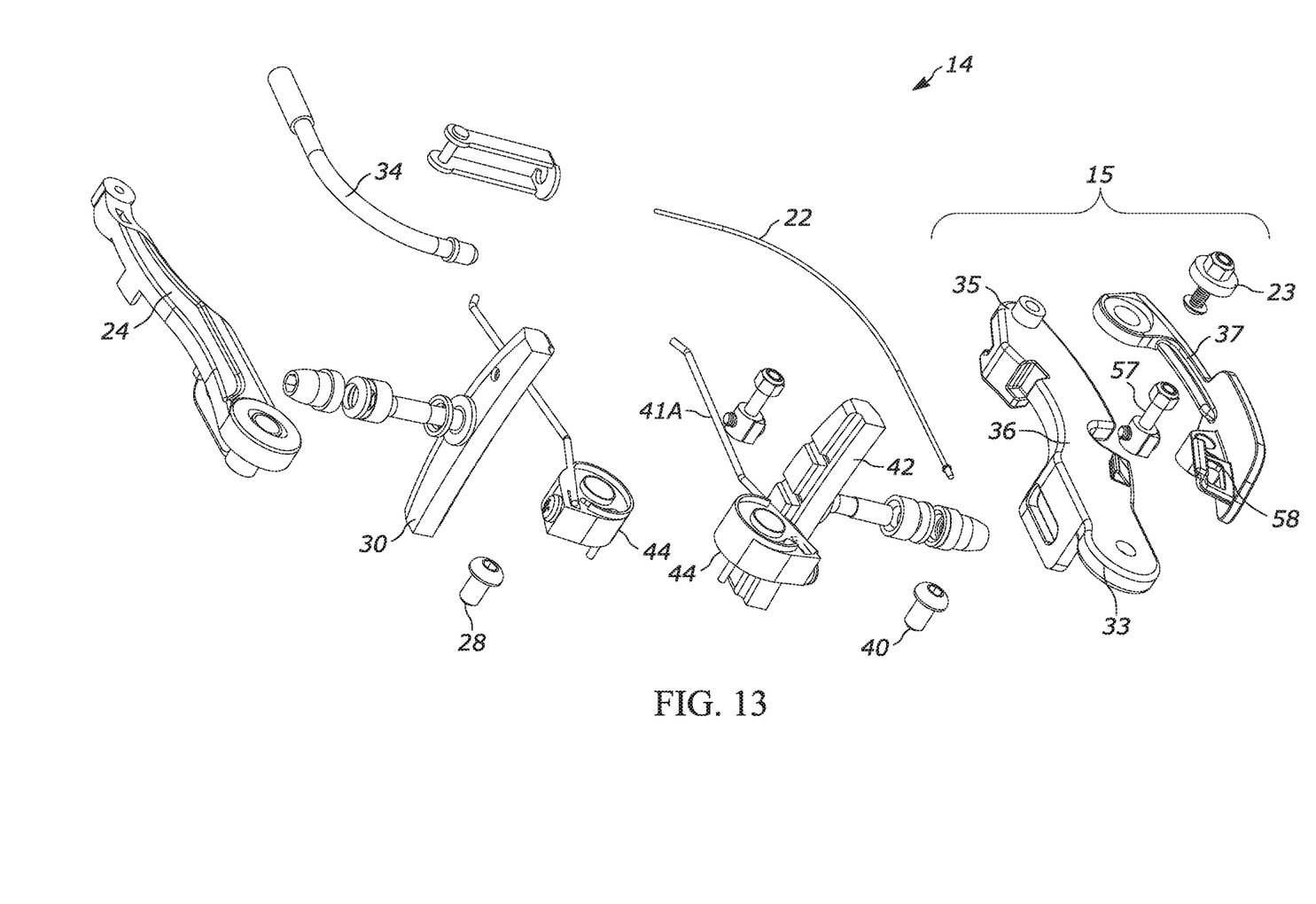
FIG. 13 is a bottom front perspective exploded view of the brake caliper of FIG. 2.
Figure 14:
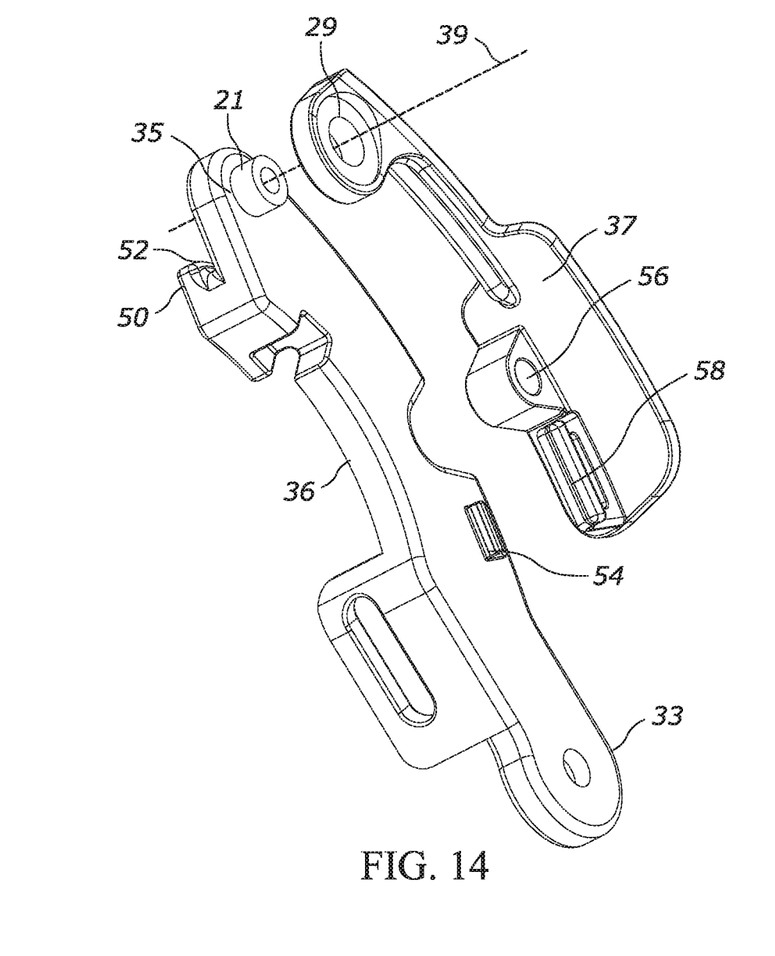
FIG. 14 is a front perspective exploded view of the brake caliper lever assembly of FIG. 2.
Figure 15:
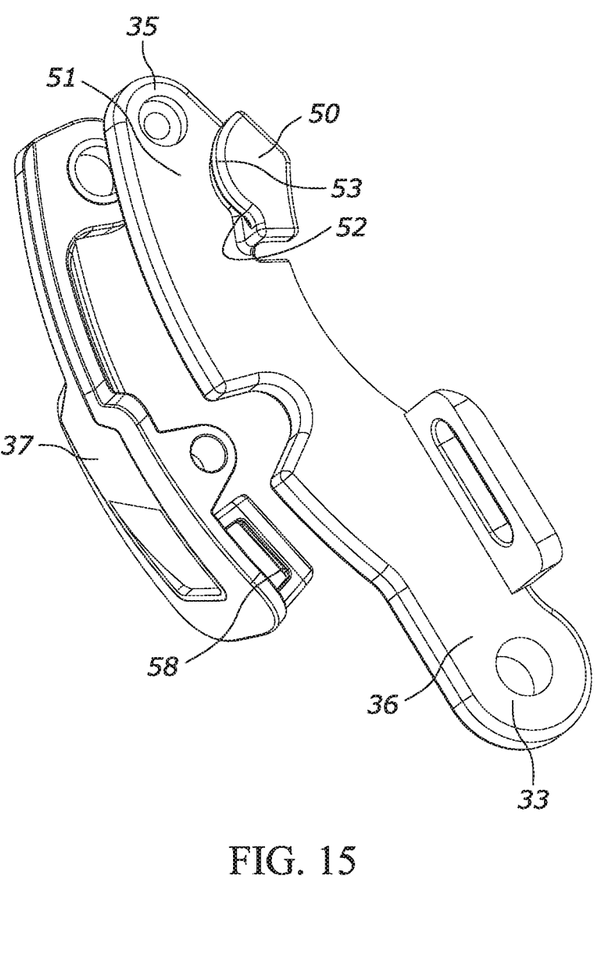
FIG. 15 is a rear perspective exploded view of the brake caliper lever assembly of FIG. 2.
Figure 16:
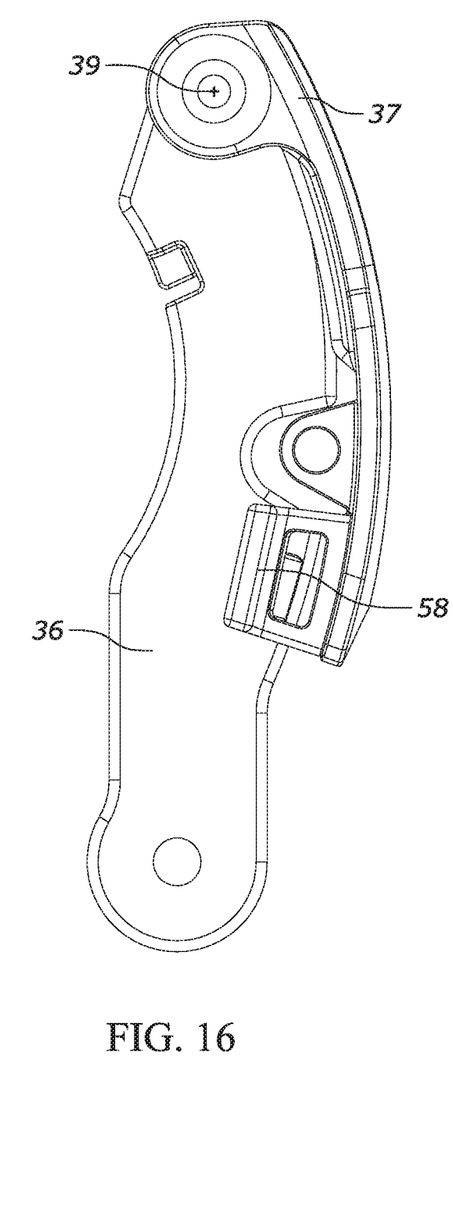
FIG. 16 is a front view of the brake caliper lever assembly of FIG. 2.
Figure 17:
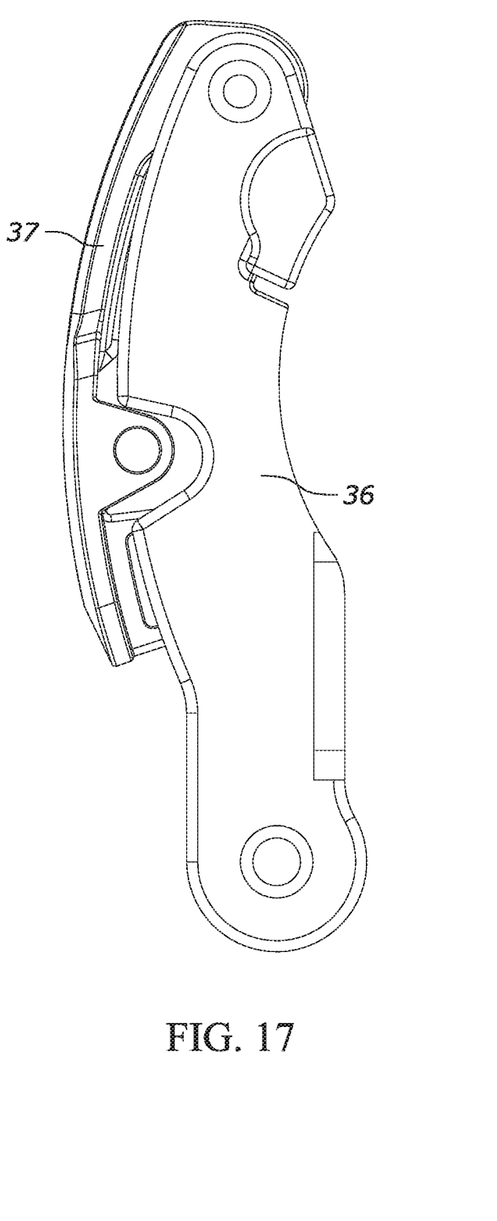
FIG. 17 is a rear view of the brake caliper lever assembly of FIG. 2.
Figure 18:
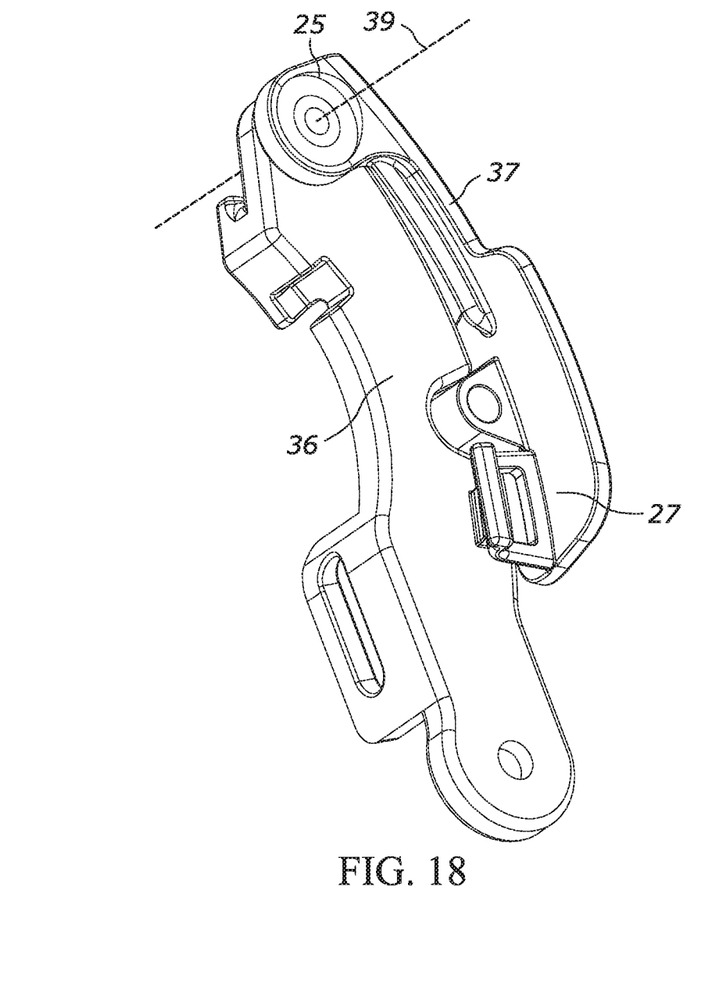
FIG. 18 is a bottom front perspective view of the brake caliper lever assembly of FIG. 2.
Figure 19:
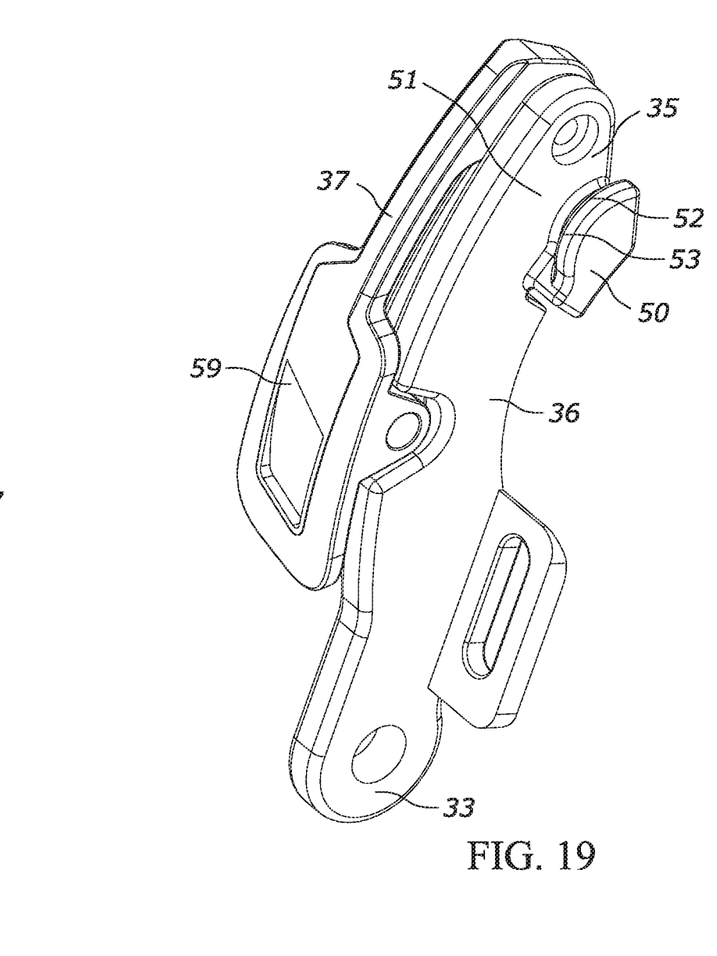
FIG. 19 is a top rear perspective view of the brake caliper lever assembly of FIG. 2.
Figure 20:
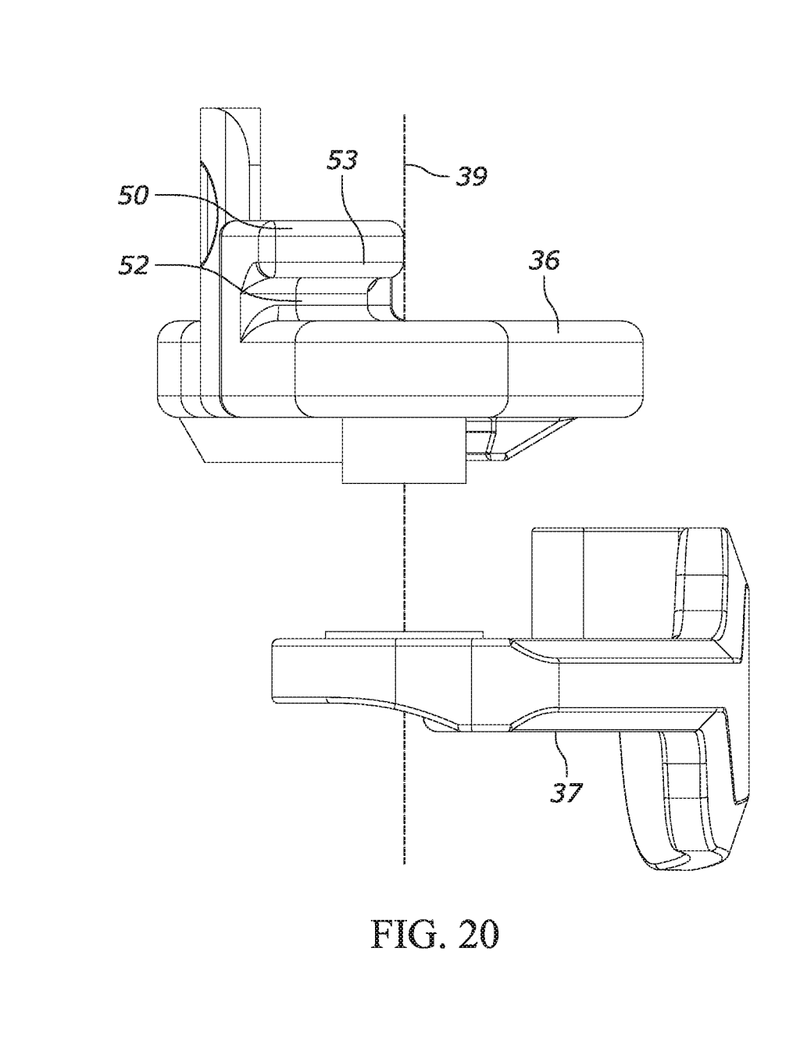
FIG. 20 is a top exploded view of the brake caliper lever assembly of FIG. 2.
Figure 21:
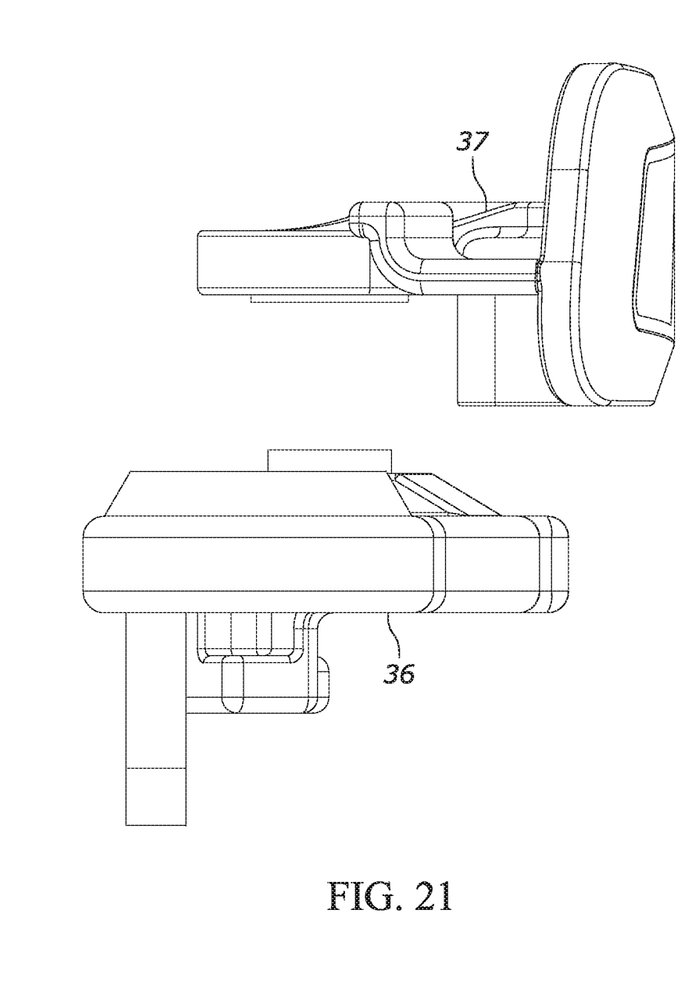
FIG. 21 is a bottom exploded view of the brake caliper lever assembly of FIG. 2.
Figure 22:
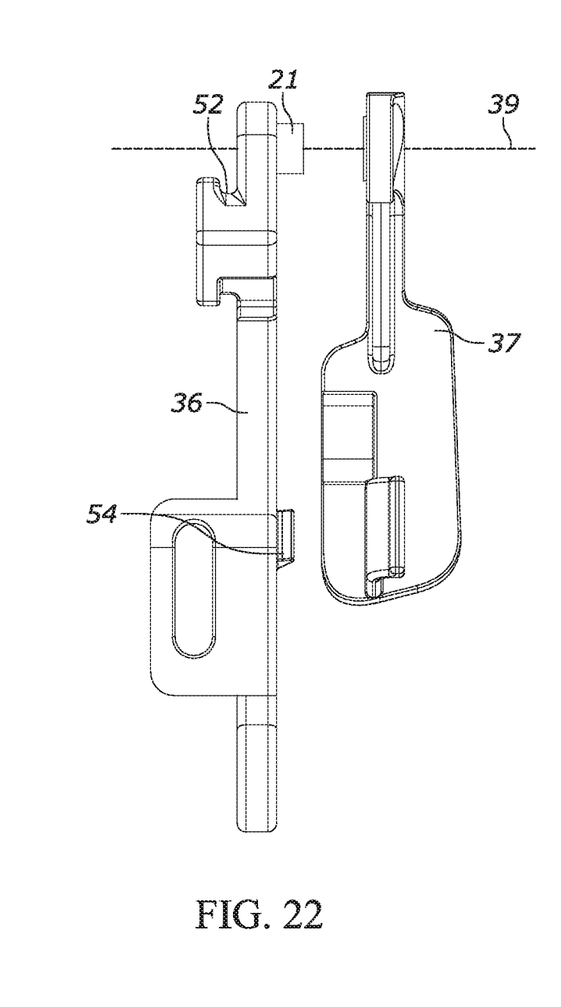
FIG. 22 is a first side exploded view of the brake caliper lever assembly of FIG. 2.
Figure 23:
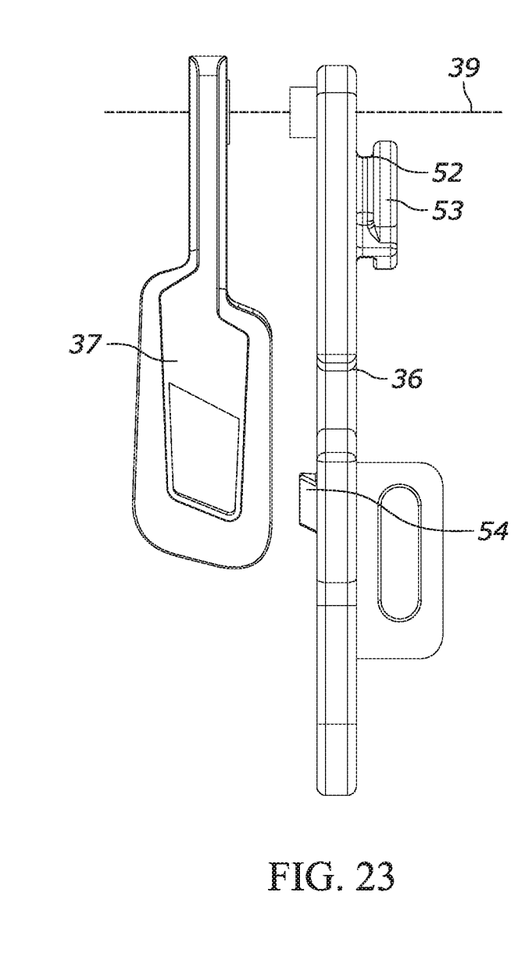
FIG. 23 is a second side exploded view of the brake caliper lever assembly of FIG. 2.

Referring to FIGS. 4-11 and 14, the brake caliper 14 is shown in various views. The cam lever 37 includes a pivot portion 25 and a latch portion 27. As shown, the second brake arm 36 includes a lower arm portion 33 and an upper arm portion 35. The lower arm portion 33 is pivotably securable to a second fork leg 38 (see FIGS. 2-3) via an arm bolt 40, and the upper arm portion 35 is pivotably secured to the pivot portion 25 of the cam lever 37, such that the cam lever 37 can rotate about a cam lever axis 39 (FIG. 14) that passes through the upper arm portion 35 and the pivot portion 25. In at least some embodiments, the upper arm portion 35 includes a cylindrical projection 21 that is sized and shaped to be matingly received within a receiving aperture 29 of the pivot portion 25 (FIG. 14), while in other embodiments other arrangements can be utilized for pivotably coupling. In at least some embodiment, securement of the cam lever 37 to the second brake arm 36 can be accomplished using a fastener 23 that extends through the cam lever axis 39, and which can include any one of numerous fastening mechanisms that allow for pivoting (e.g., nut and bolt, etc.). A second brake block 42 is secured to the second brake arm 36 to provide braking friction with the wheel 20. Each of the brake arms 24, 36 are biased in a direction away from each other using a spring 41. FIGS. 12 and 13 provide exploded views of the brake caliper 14. The brake blocks 30, 42, as well as their fastening mechanisms 43 are well known. In addition, each of the brake arms 24, 36 can utilize well known adjustable brake spring covers 44 engaged with the springs 41 to adjust the outward bias on the brake arms 24, 36 relative to the arm bolts 28, 40.

Referring to FIGS. 14-23, the brake caliper lever assembly 15 is shown in various views. As noted above, the brake caliper lever assembly 15 includes the fastener 23, although for illustration purposes only, the fastener 23 shown in FIGS. 1-13 has been omitted from these views. As shown, the brake caliper lever assembly 15 includes a cam 50 provided along the upper arm portion 35 of the second brake arm 36. The cam 50 includes an arced portion 53 forming a cable groove 52 sized to receive the brake cable 22 therein. In at least some embodiments, the cam 50 protrudes from an outer sidewall 51 of the upper arm portion 35 in a direction away from the second brake arm 36. The second brake arm 36 further includes a latch tab 54. The cam lever 37 includes a cable clamp portion 56 for securing a cable clamp 57 (see FIG. 7) to which the brake cable 22 is securable. In at least some embodiments, the cable clamp 57 is a threaded fastener, while in other embodiments, the cable clamp 57 can secure the brake cable 22 using other known methods. In addition, in at least some embodiments, the cable clamp 57 can be at least partially integrally formed on the cam lever 37.

In at least some embodiments, the latch portion 27 of the cam lever 37 includes a latch 58, which is configured to engage the latch tab 54 when the cam lever 37 is rotated into a closed position. It shall be understood that in at least some embodiments, various types of latching mechanisms known in the art can be utilized for selectable engagement of the cam lever 37 with the second brake arm 36, and therefore the latch tab 54 and latch 58 are understood to be exemplary and can be replaced or modified to utilize various other engaging mechanisms. In at least some embodiments, the cam lever 37 further includes a handle portion 59 for engagement by a user's hand to lower or lift the cam lever 37.

Figure 24:
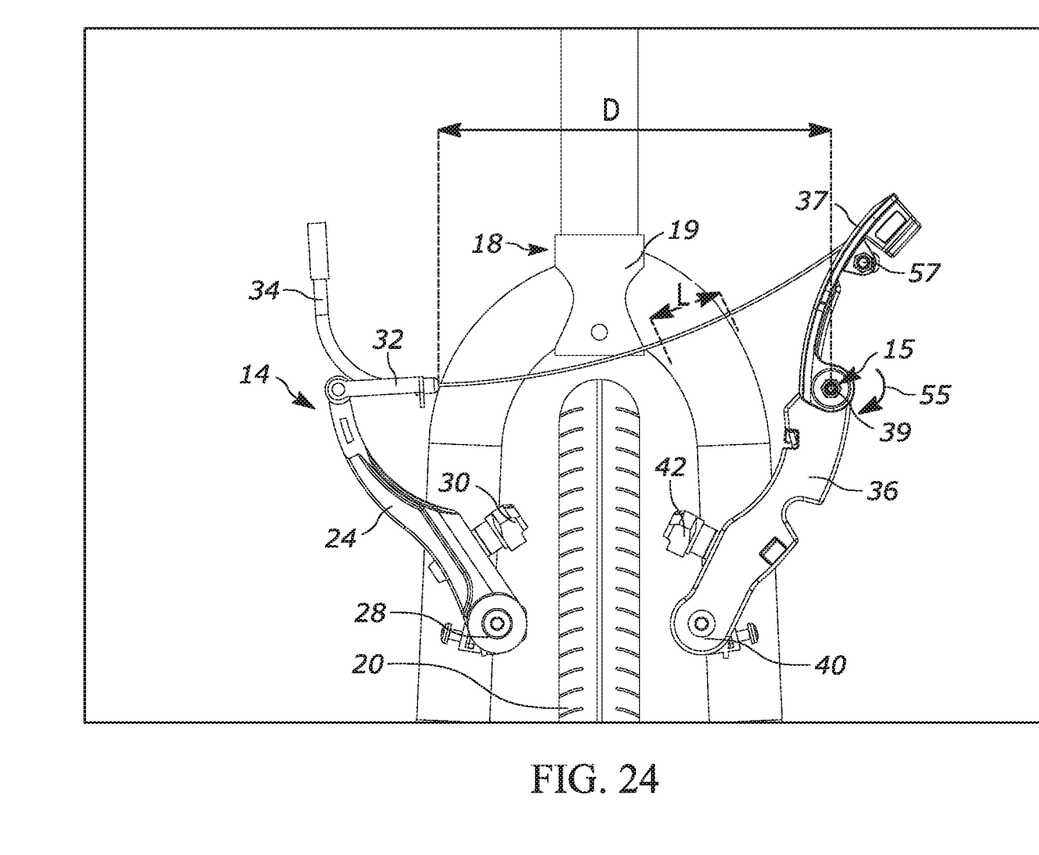
FIG. 24 is a front view of the front fork assembly, wheel, and brake caliper of FIG. 1, with the brake caliper lever assembly in an open position.
Figure 25:
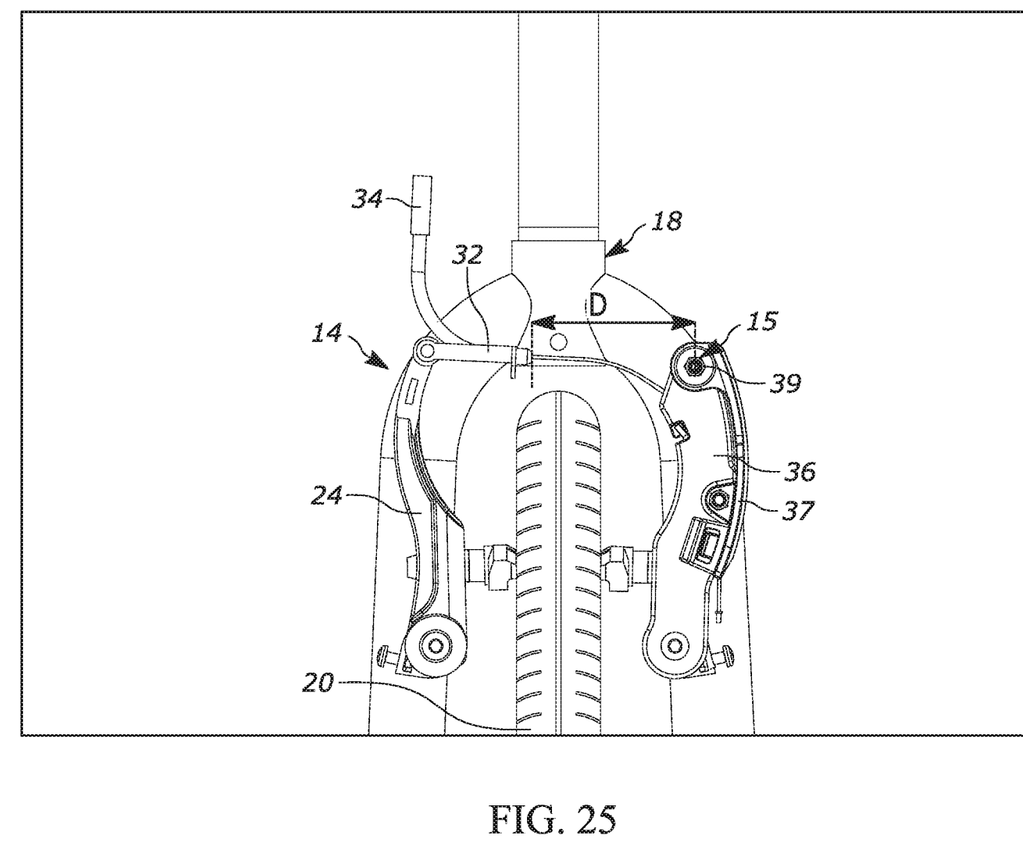
FIG. 25 is a front view of the front fork assembly, wheel, and brake caliper of FIG. 1, with the brake caliper lever assembly in a closed position.

The brake caliper lever assembly 15 is considered in a closed position when the cam lever 37 is latched with the second brake arm 36 (e.g., FIG. 7 and FIG. 25) via the latch tab 54 and latch 58, and considered in an open position when the cam lever 37 has been unlatched and rotated upward and away from the second brake arm 36 (e.g., FIG. 24). As best seen in FIGS. 5-7, and 10, when installed, the brake cable 22 is fed through the cable guide 34, then along the cam 50 via the cable groove 52, and finally secured at the cable clamp 57. When the brake caliper lever assembly 15 is placed in a closed position by rotating the cam lever 37 downward (rotation arrow 55 shown in FIG. 24), a length L of the brake cable 22 is displaced by the cam 50, shortening the distance D (FIGS. 24 and 25) between the cable bridge 32 and the cam lever axis 39, thereby pulling the first brake arm 24 and second brake arm 36 inward towards each other as they pivot via their respective arm bolts. This movement places the brake blocks 30, 42 in the desired braking position adjacent the wheel 20 (see FIG. 25) and maintains the desired tension on the brake cable for proper actuation. The cam lever 37 is secured to the second brake arm 36 to maintain the displacement of the brake cable 22 and to provide the necessary tension for suitable braking action. Conversely, when the cam lever 37 is disengaged (e.g., unlatched) from the second brake arm 36 and rotated upward about the cam lever axis 39 in an opposite rotational direction, the brake cable 22 that was wrapped over the cam 50 is released, and the no longer displaced length L of brake cable 22 allows the first brake arm 24 and second brake arm 36 to move away from each other as they pivot via spring bias about their respective arm bolts, thereby increasing the distance D. This places the brake caliper lever assembly 15 in an open position and allows the brake blocks to move sufficiently apart (see FIG. 24) for the wheel 20 to be easily removed. The exemplary length L of displaced brake cable 22 has been illustrated in FIG. 24 as an exemplary length, this length L can vary depending on the size and positioning of the cam 50, as well as the positioning of the cable clamp 57, among other things.

The size of the cam 50 and associated cable groove 52 can be varied to accommodate various sizes of brake arms 24, 36, with a larger cam able to provide additional brake cable displacement for greater movement of the brake arms and brake blocks. The cam 50 can also be situated either closer to or further from the upper arm portion 35. In addition, although the brake caliper lever assembly 15 has been described generally for convenience with reference to the front brake caliper 14, the rear brake caliper 16 can be identical to the front brake caliper 14, or otherwise incorporate the brake caliper lever assembly 15. Further, the brake caliper lever assembly 15 can be used with numerous other types of brake calipers and on wheeled vehicles other than a bicycle.

Fasteners and other components have been illustrated in various figures, although some fasteners and components may have been omitted from certain figures for clarity. The various components can be manufactured using one or more different types of materials, including plastic, carbon fiber, metal, etc. Although the invention has been herein described in what is perceived to be the most practical and preferred embodiments, and the FIGS. have illustrated various exemplary shapes and sizes, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A brake caliper comprising:
   a first brake arm;
   a cable bridge pivotably secured to the first brake arm;
   a cable guide coupled to the cable bridge;
   a second brake arm having a lower arm portion and an upper arm portion;
   a cam directly situated on the upper arm portion, the cam including an arced portion forming a cable groove;
   a cam lever comprising:
      a pivot portion rotatably secured to the upper arm portion at a cam lever axis;
      a latch portion for releasable securement to the second brake arm; and
      a cable clamp for securing a brake cable that extends through the cable guide; and
   wherein the brake cable is situated in the cable groove when the latch portion of the cam lever is secured to the second brake arm, and wherein the brake cable is not situated in the cable groove when the latch portion of the cam lever is unsecured from the second brake arm.

2. The brake caliper of claim 1, wherein the cam protrudes from an outer sidewall of the upper arm portion in a direction away from the second brake arm.

3. The brake caliper of claim 1, wherein the first brake arm is pivotably secured adjacent a first side of a wheel and the second brake arm is pivotably secured adjacent a second side of the wheel, opposite the first brake arm.

4. The brake caliper of claim 3, wherein the brake cable is engaged by the cable groove during a rotational closing of the cam lever, and wherein the cam displaces a length of the brake cable to shorten the distance between the cable bridge and the cam lever axis, thereby pivoting the first brake arm and second brake arm inwards towards each other.

5. A brake caliper comprising:
   a first brake arm;
   a cable bridge pivotably secured to the first brake arm;
   a cable guide coupled to the cable bridge;
   a second brake arm having a lower arm portion and an upper arm portion;
   a cam directly situated on the upper arm portion, the cam including an arced portion forming a cable groove;
   a cam lever comprising:
      a pivot portion rotatably secured to the upper arm portion at a cam lever axis;
      a latch portion for releasable securement to the second brake arm; and
      a cable clamp for securing a brake cable that extends through the cable guide;
   wherein the first brake arm is pivotably secured adjacent a first side of a wheel and the second brake arm is pivotably secured adjacent a second side of the wheel, opposite the first brake arm;
   wherein the brake cable is engaged by the cable groove during a rotational closing of the cam lever, and wherein the cam displaces a length of the brake cable to shorten the distance between the cable bridge and the cam lever axis, thereby pivoting the first brake arm and second brake arm inwards towards each other; and
   wherein the brake cable is disengaged from the cable groove during a rotational opening of the cam lever, thereby abating the displacement of the brake cable by the cam and increasing the distance between the cable bridge and the cam lever axis to allow the first brake arm and second brake arm to pivot outwards away from each other.

6. The brake caliper of claim 5, further comprising a first brake block secured to the first brake arm and a second brake block secured to the second brake arm.

7. The brake caliper of claim 6, wherein the first brake arm is pivotably secured to a first fork leg of a front fork assembly and the second brake arm is pivotably secured to a second fork leg of the front fork assembly.

8. The brake caliper of claim 7, wherein the front fork assembly is mounted to a bicycle frame.

9. The brake caliper of claim 6, wherein the first brake arm and second brake arm are pivotably secured to a bicycle frame.

10. A brake caliper comprising:
   a first brake arm;
   a cable bridge pivotably secured to the first brake arm;
   a second brake arm having a lower arm portion and an upper arm portion, wherein the first brake arm and second brake arm are pivotably secured to a bicycle frame on opposing sides of a wheel;
   a cam protruding from an outer sidewall of the upper arm portion, the cam including an arced portion forming a cable groove;
   a cam lever comprising:
      a pivot portion rotatably secured to the upper arm portion at a cam lever axis;
      a latch portion for releasable securement to the second brake arm; and
      a cable clamp for securing a brake cable;
   a cable guide coupled to the cable bridge, wherein the brake cable extends through the cable guide and is secured to the cable clamp;
   wherein the brake cable is engaged by the cable groove during a rotational closing of the cam lever, and wherein the cam displaces a length of the brake cable to shorten the distance between the cable bridge and the cam lever axis, thereby pivoting the first brake arm and second brake arm inwards towards each other; and
   wherein the brake cable is disengaged from the cable groove during a rotational opening of the cam lever, thereby abating the displacement of the brake cable by the cam and increasing the distance between the cable bridge and the cam lever axis to allow the first brake arm and second brake arm to pivot outwards away from each other.

* * * * *